No. 703,827. Patented July 1, 1902.
J. O. RANDALL.
HEATING AND VENTILATING SYSTEM.
(Application filed Mar. 3, 1902.)
(No Model.) 2 Sheets—Sheet 1.

WITNESSES
INVENTOR
J. O. Randall
by E. H. Bates Attorney

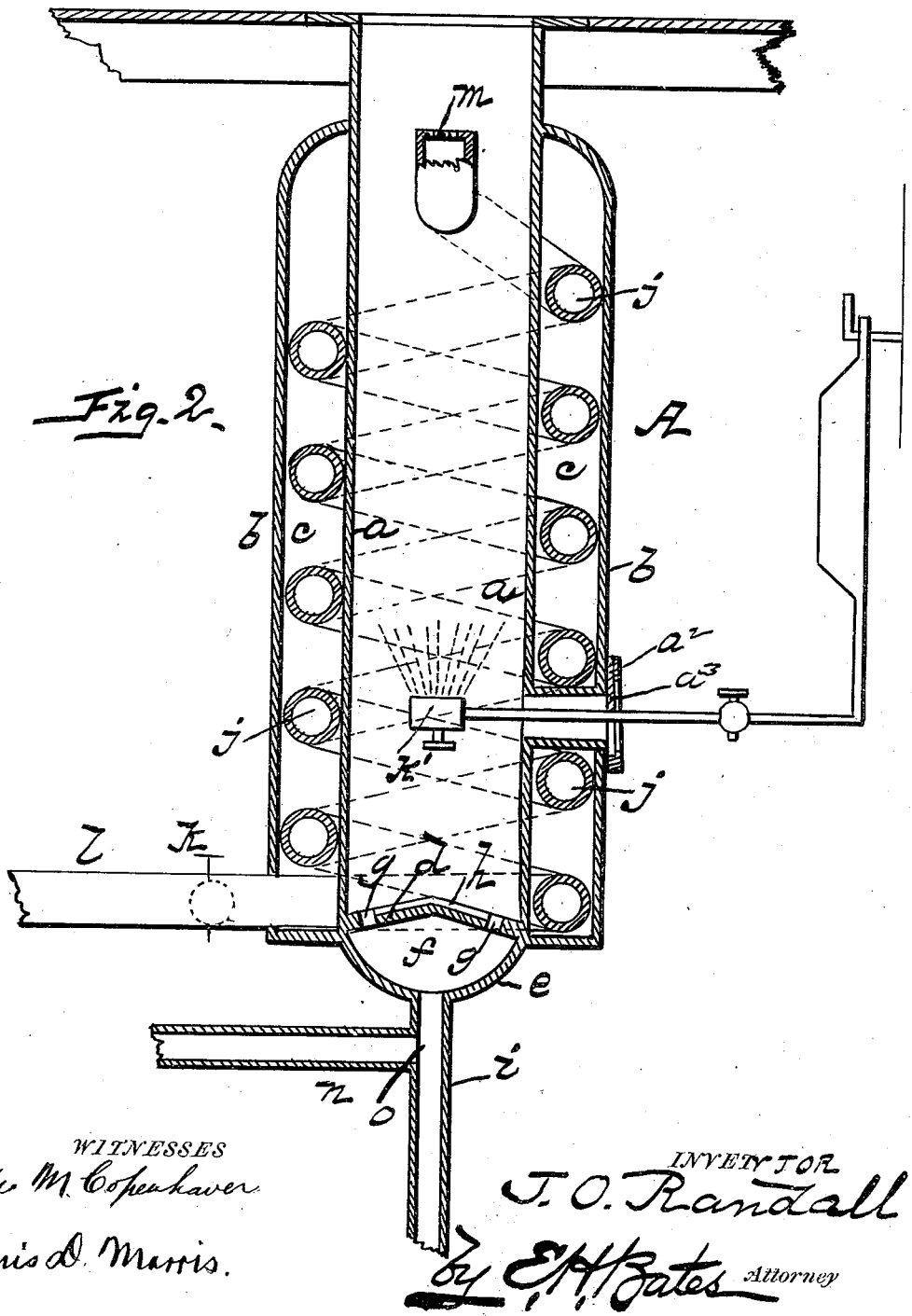

UNITED STATES PATENT OFFICE.

JESSE O. RANDALL, OF SILVERSPRINGS, NEW YORK.

HEATING AND VENTILATING SYSTEM.

SPECIFICATION forming part of Letters Patent No. 703,827, dated July 1, 1902.

Application filed March 3, 1902. Serial No. 96,422. (No model.)

*To all whom it may concern:*

Be it known that I, JESSE O. RANDALL, a citizen of the United States, residing at Silversprings, in the county of Wyoming and State of New York, have invented a certain new and useful Improvement in Heating and Ventilating Systems; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention has relation to means for purifying the air and ventilating interior of buildings, particularly dwellings; and it consists in the novel construction, combination, and arrangement of parts of which it is composed, all as will be hereinafter more fully explained, and particularly pointed out in the appended claim.

The annexed drawings, to which reference is made, fully illustrate my device, in which—

Figure 1:
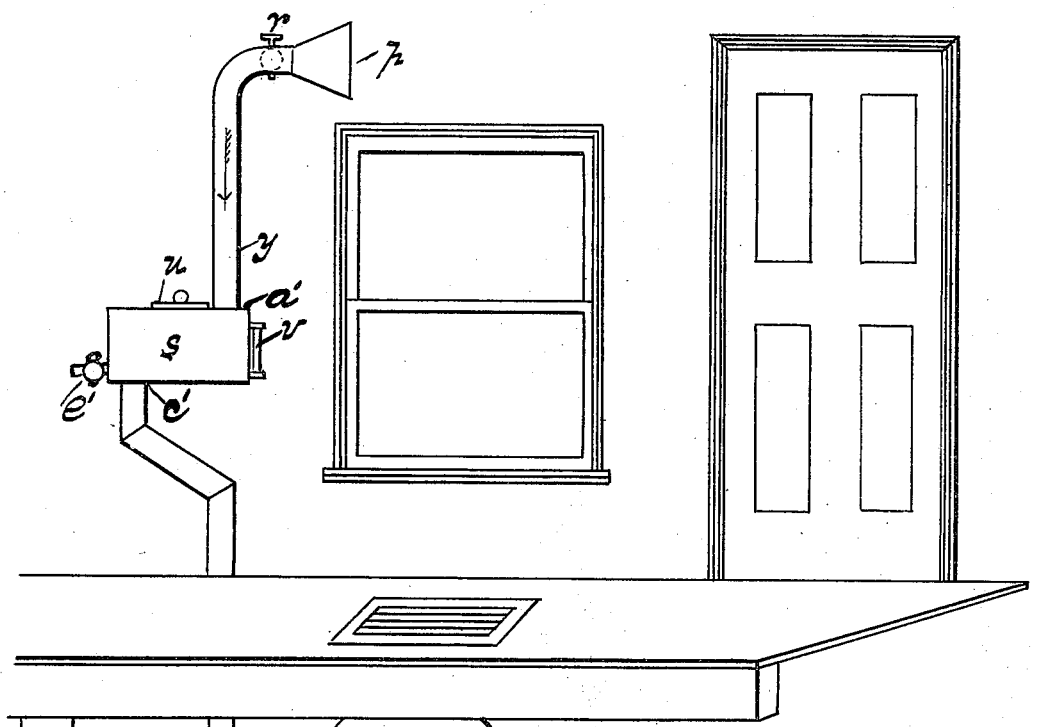
Figure 1:
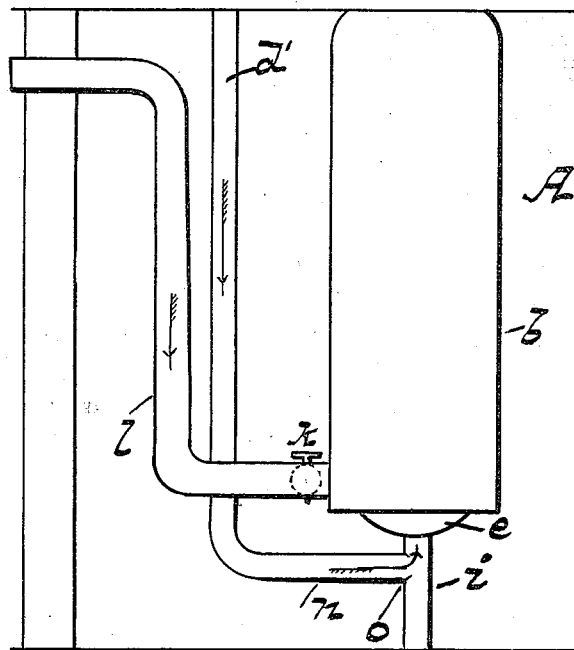

Figure 1 represents a portion of a dwelling, showing my device in position for heating and purifying the air. Fig. 2 is a vertical sectional view of the generating-cylinder.

Referring by letter to the accompanying drawings, A designates a heat-generating cylinder composed of an inner wall $a$, an outer wall $b$, between which is a space $c$, and at the lower end of this cylinder the same is provided with an inner and outer head $d$ $e$, between which is also a space $f$. The upper head $d$ is provided with perforations $g$, and the same is slightly elevated about its center and is provided with grooves $h$, that extend from the center to the perforations or openings aforesaid. To the lower head of this cylinder is secured a vertical pipe $i$. The upper end thereof communicates with the space between the two heads.

The inclosed generating-cylinder is surrounded with spiral and transverse flues $j$, and said flues are inclosed between the inner and outer walls of the generating-cylinder, said flues communicating with the central space and above the inner perforated head, and is provided with a regulating-damper or cut-off $k$, whereby the air is controlled in entering the generating-cylinder. The pipe or flue $l$, in which this damper is arranged, leads from the lower portion of the space $c$ upward to a point below the top of the generating-cylinder and outward through the building-wall into the open air.

The spiral flues terminate at the top of the generating-cylinder and communicate therewith, near the top thereof, through perforations, as at $m$, thereby permitting the vitalized air to enter the generating-cylinder directly under the register or to be carried from this point by register-flues leading therefrom.

To the vertical pipe $i$ is secured a horizontal pipe $n$, having communication therewith, as at $o$, and extending vertically. This pipe terminates in funnel-shaped opening $p$, which is provided with a damper $r$, whereby the passage of air is regulated. This vertical pipe is connected to a dust-collector and purifying-tank $s$, which consists of a rectangular vessel that is closed on all sides and bottom and provided at its top with an opening having a closely-fitted cover $u$ and the glass gage $v$, whereby water within the tank may be gaged.

The vertical pipe is connected to the tank in the following manner: The upper portion or section $y$ of this vertical pipe has its lower end $a'$ passing through the top of the tank to one side of the central opening. This tank is also provided with an outlet-pipe $c'$, having a shut-off faucet for drawing off water from the tank.

Having thus described the different parts of which my device is composed, I will now proceed to explain its operation.

The interior or central passage of the cylinder being provided with flame or heat, (the drawings showing a gasolene-burner $k'$,) the air in the room enters the upper section of the vertical pipe through the enlarged opening or pipe $p$ and passes downward and into the tank $s$ over the surface of the water, the latter being pregnated with charcoal for the absorption of noxious gases, after which it descends to and enters the short vertical pipe $i$ and thence takes an upward course and enters the space between the inner and outer lower head of the generator, after which it passes through the central perforations into the central flue, where it contacts with the flame, supporting combustion, thus forming a medium for draft, and through the medium of the spiral and transverse flues the fresh air entering the central opening through the perforations $m$ contacts with the heated air and is carried to the room or apartment through the register. The cold air passing to the generating-cylinder is used as an auxiliary to the air passing from the room through the tank, and the same is regulated by the damper $k$ should the room or apartment become overheated. Thus it will be observed that the cold air is removed from the room through the collecting-pipe, thence to the dust-arresting tank, where it is purified before it is passed down to the generating-cylinder, where it is vitalized by outdoor air and being kept in constant motion and being constantly reheated and vitalized provides not only healthful apartments, but is a great saving in fuel for heating purposes. All impurities, dust, and other foreign bodies circulating in the atmosphere of the room are carried into the dust-arresting tank and there deposited on the surface of the water. The tank is relieved of the impure water through the pipe thereof having the faucet, and fresh water is poured therein through the opening in the top. The generator is provided with an opening having a door $a^2$, having mica $a^3$, whereby the interior thereof may be examined without opening the door and interfering with the draft through the vertical pipe aforesaid. The generating-cylinder may be placed below the room to be heated and vitalized if two or more registers are used; but if only one register is used the cylinder can be placed within the apartment to be heated and vitalized. When liquid fluid, such as oil or gasolene, is used, the drippings are caught by the grooves in the perforated plate $d$ and carried through said perforations to the short pipe $i$ and to the ground.

It will be readily observed that in operating my device the air from the room that supports combustion is received by the vertical pipe at the uppermost portion of the room and that the dust-receiver and purifier is arranged upon said pipe some distance from the floor of the room, and the vitalizing-air pipe connects with the vitalizing-flue at the base of the generating-cylinder, and its outer terminus is outside of the building and below the upper end of the generating-cylinder, and by means of the dampers the heated and fresh air or reheated air is controlled, regulated, and maintained, as the valves or dampers can be adjusted to a nicety, and a device as herein described is easily operated, not liable to get out of order, simple in construction and operation, and inexpensive to manufacture, and the same can be readily applied to public buildings—such as churches, school-rooms, halls, lecture-rooms, or office-rooms—as well as private dwellings and apartment-buildings.

Having thus described my invention, what I claim, and desire to secure by Letters Patent, is—

The combination with the cylinder having double walls, spaced apart and a pipe $j$ arranged within said space, and having its upper end extending into the space inclosed by said cylinder, of the inclined head at the lower end of said cylinder and provided with grooves $h$ in its upper surface and perforations $g, g$, in its periphery, the outer head $e$ spaced from said inner head, a drip-pipe attached to said outer head and in communication with the space between the heads, and a pipe $d'$ connected to said drip-pipe and adapted to supply air thereto, substantially as described.

In testimony whereof I affix my signature in presence of two witnesses.

JESSE O. RANDALL.

Witnesses:
CHAS. T. WALKER,
F. T. DUDLEY.